United States Patent [19]

Adolfsson

[11] Patent Number: 4,645,047
[45] Date of Patent: Feb. 24, 1987

[54] FREEWHEEL MECHANISM
[75] Inventor: Rune Adolfsson, Borås, Sweden
[73] Assignee: SKF Nova AB, Goteborg, Sweden
[21] Appl. No.: 780,400
[22] Filed: Sep. 26, 1985
[30] Foreign Application Priority Data
Nov. 28, 1984 [SE] Sweden .................................. 8406001
[51] Int. Cl.⁴ .............................................. F16D 11/06
[52] U.S. Cl. ................................ 192/12 B; 192/41 A; 192/45.1
[58] Field of Search ...................... 192/41 A, 12 B, 80, 192/110 R, 45.1; 188/82.8

[56] References Cited
U.S. PATENT DOCUMENTS

| 3,388,779 | 6/1968 | Ropel | 192/45.1 X |
| 3,432,015 | 3/1969 | Schwerdhöfer | 192/41 A X |
| 3,712,431 | 1/1973 | Versoy | 192/12 B |

Primary Examiner—William F. Pate, III
Assistant Examiner—Richard Chilcot
Attorney, Agent, or Firm—Eugene E. Renz, Jr.

[57] ABSTRACT

In a freewheel mechanism with a number of blocking members arranged between raceways on two elements, one raceway is arranged on a body which is co-operating with one of the elements and is turnable thereon. The circumference of the body is variable for varying the distance between the raceways. The variations can take place because the body is elastically deformable radially and by tightening and releasing a threaded portion between the body and the element, the thread flanks thereby acting as wedges. The purpose of the arrangement is to avoid jamming of the freewheel by the blocking members upon reversal of the direction of rotation when the blocking members are in blocking position. The unwanted torque developed during jamming of the freewheel releases the tightened thread joint between the body and the element, whereby the circumference of the body and the distance between the raceways of the freewheel is increased so that the blocking members are released.

6 Claims, 4 Drawing Figures

FREEWHEEL MECHANISM

FIELD OF THE INVENTION

The present invention relates to improvements in freewheeling mechanisms for transmitting rotational movement between machine elements.

BACKGROUND OF THE INVENTION

In mechanisms comprising a freewheel it is frequently desirable to prevent torque transmission from one to the other of the elements connected to the freewheel, and to allow free rotation in both directions of one element. When, for example, double acting freewheels are used in four wheel driven motor cars there is a problem to avoid jamming if the freewheel, e.g. due to the driving wheels slipping, is in torque transmitting operation when the vehicle is stopped and the direction of propulsion is then reversed. A car wheel connected to the freewheel is in normal operation, i.e. when no slip occurs, rotating faster than the car wheel drive shaft from the motor which is connected to the freewheel and if the freewheel is torque transmitting when stopped, then at the start in the reversed direction the motor acts as a brake for the car wheel, and the freewheel is not disengaged until the drive shaft rotates faster than the car wheel.

Existing proposals for solving this problem comprise electric and hydraulic systems, which are complicated and expensive.

SUMMARY OF THE INVENTION

The purpose of the present invention is to provide a simple, inexpensive and reliable device of the kind stated in the introduction, with which device undesired torque transmission from one to the other of two elements connected to a freewheel is avoided and free rotation in both directions of one element is allowed.

To this end, in accordance with the present invention, the freewheeling mechanism comprises a plurality of tiltable block members arranged between two co-axial annular raceways associated with the machine elements wherein one of the raceways is arranged on a body cooperating with one element, which body is movable in relation to the elements so that the distance between the first and second raceways is variable. The variations of the distance between the raceways is achieved by relative turning of the body in the element cooperating therewith.

In such a device the above-mentioned problems of jamming the freewheel in a four wheel driven vehicle when the direction of driving is reversed are solved by means which are less complicated than such means which have hitherto been suggested for this purpose.

BRIEF DESCRIPTION OF THE DRAWINGS

The following is a detailed description of the invention with reference to the accompanying drawing, in which.

DESCRIPTION OF THE PREFERRED EMBODIMENT

Figure 1:
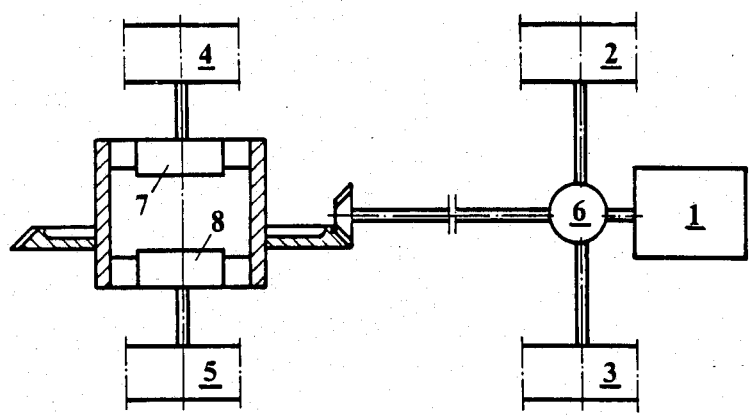
FIG. 1 shows the principle of an embodiment of a four wheel drive system of a motor vehicle.

The vehicle shown in FIG. 1 has a motor 1 which drives four wheels 2, 3, 4, 5. The wheel pair 2, 3 is driven directly via a gear mechanism 6, and the wheel pair 4, 5 is driven via an arrangement with a pair of freewheels 7, 8 connected to the mechanism 6 and to the vehicle wheels 4, 5, respectively. The freewheels may have a common outer ring. The gear ratio is such that during normal operation, i.e. when none of the wheels is slipping on the ground, the freewheel ring connected to gear mechanism 6 rotates somewhat slower than the freewheel rings connected to the vehicle wheels 4, 5, thus the freewheels are free running. No power transmission takes place over the wheels 4, 5 unless at least one of the wheels 2, 3 slips against the ground. Then the freewheels are engaged and power is transmitted to the wheels 4, 5.

Should the rotation of the vehicle wheels cease when the freewheels are engaged and the drive direction is then reversed with no wheel slipping, the freewheel rings connected to the vehicle wheels will be rotating faster than the rings connected to the gear mechanism 6. As the freewheel in this position transmits torque from the vehicle wheel to the motor, the power transmission will be locked. In order to disengage the freewheels when the vehicle is moving in the reversed direction, one of the wheels 2, 3 must be brought to slip against the ground, which means extra wear and stress on tires and power transmission and may cause a breakdown.

This and other problems which may occur with jammed freewheels are avoided if the freewheel is made according to the invention.

Figure 2:
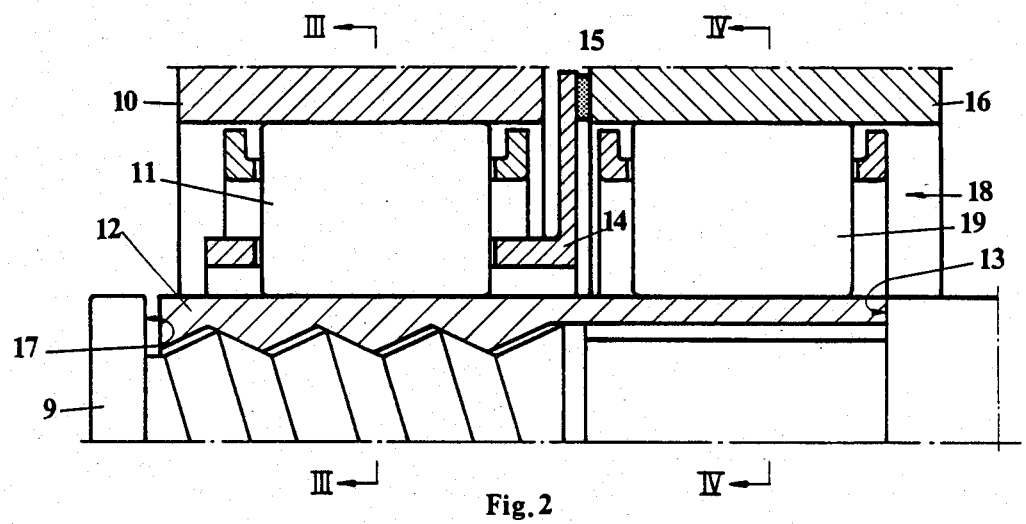
FIG. 2 shows details of a longitudinal section of a freewheel device according to the invention and suitable for use in a device according to FIG. 1.
Figure 3:
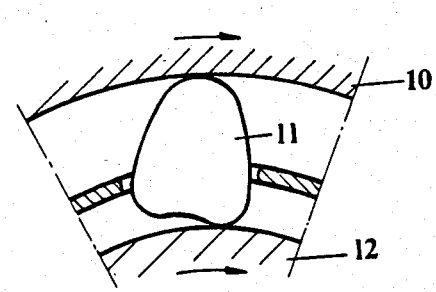
FIGS. 3 and 4 show cross sections of the device according to FIG. 2 in the planes III—III and IV—IV, respectively.
Figure 4:
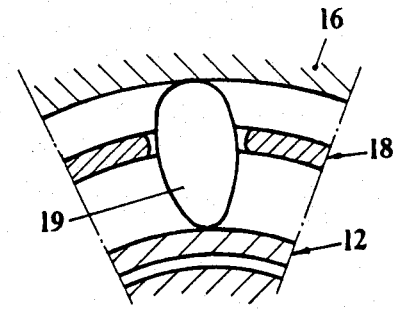

One embodiment is shown in the FIGS. 2-4. The device shown therein is intended for transmitting rotational movement between two elements, e.g. a wheel axle 9 and a drive mechanism 10 for the wheel. The freewheel has, in a manner known per se, a number of tiltable blocking members 11 placed between two raceways which are arranged in connection to the respective elements. One raceway is arranged on a body 12 which co-operates with and is turnable in relation to one element 9. The body 12 is movable so that the distance between its raceway and the raceway connected to the other element is variable. The variations can be brought about by a wedging action occurring between a surface on the body 12 and a surface on element 9 when the body 12 is turned in relation to element 9. The body 12 is elastically deformable in a radial direction so that its raceway has a variable circumference. The wedging action with which the variations are brought about can be obtained by forming the body 12 as a sleeve on the element 9, which has the shape of a journal, co-operating threads being provided on the journal and in the sleeve. The flanks of the threads form a comparatively small angle with the journal axis and constitute wedging surfaces. The flank angle is suitably smaller than the friction angle in the contact surfaces of the flanks, so that a torque transmitted from the drive mechanism 10 via the blocking members 11 to the sleeve 12 is also transmitted to the element 9 when the torque acts in the release direction of the thread joint.

When the device rotates clockwise according to FIG. 3 and the sleeve 12 is tightened on the thread of element 9 into contact against an end stop 13 on element 9 (FIG. 2), whereby the sleeve is expanded radially because of the wedging action of the thread flanks so that the distance between the raceways on elements 10 and 12 allows the blocking members 11 to perform their blocking function, the freewheel is free running if element 9 rotates faster than element 10, whereas the freewheel is torque transmitting if element 10 tends to rotate faster than element 9. If the rotation ceases while the freewheel is torque transmitting and a change of direction of rotation takes place, whereby element 9 tends to rotate faster than element 10, the torque transmitting position of the freewheel is retained so that a torque in the "wrong" direction acts on the freewheel. A device according to the present invention prevents torque to be transmitted through the freewheel in this situation. In the embodiment shown, the reversed torque causes the sleeve 12 to be screwed off its tightened position on element 9, whereby the wedging action on the thread flanks ceases and sleeve 12 is revealed of its pre-stress so that its circumference decreases, whereby the distance between the raceways for the blocking members 11 increases so that the blocking members lose their grip of the raceways and are turned to a neutral position. Therewith the element 12 is allowed to rotate freely faster than element 10.

Four wheel driven vehicles with reversible drive direction have double acting freewheels, i.e. the freewheels have free running and torque transmitting functions in both directions of rotation. The device shown in FIGS. 2-4 is provided with such a freewheel. It comprises, in a manner known per se, a number of symmetrical blocking members 11, the tilting of which is guided by a cage 14 which is braked by frictional contact (at 15) against a non-rotating housing 16.

The sleeve 12 can be turned into a desired pre-stress and wedging action in the thread flanks by the fact that element 9 has double end abutments 13, 17 arranged to that suitable axial tightening and radial expansion of sleeve 12 takes place by turning the sleeve in either direction on the thread of element 9, which has flanks that are tapering in both directions. The desired turning of the sleeve 12 on element 9 can be brought about by using a braking member 18 co-operating with the sleeve. The member is initially blocking when changing the direction of rotation of the sleeve, but it is released upon surpassing a given torque. The braking member can be a freewheel device which is released at a given torque and comprises a number of blocking members 19 arranged between raceways in the housing 16 and in the sleeve 12. If at least one raceway and/or the blocking members are elastically deformable, the blocking members may prevent rotation of the sleeve in relation to the housing 16 upon change of direction of rotation while element 9 is turned in the sleeve, whereby the circumference of the sleeve is at first decreased so that the blocking members 11 are released. Upon further turning, the sleeve 12 is pre-stressed into contacting one of the abutments 13, 17, whereby a desired force in the proper direction in the thread flanks is obtained. Thereafter the sleeve 12 follows the turning movement and the blocking members 19 are turned past the blocking position, which is possible because of the deformation occurring by the applied torque. The blocking members 19 thereby take a released position and the sleeve and element 9 can rotate freely without being obstructed by the blocking members, which have taken a position for braking during rotation in the opposite direction. The device thus operates during rotation in both directions.

Also other embodiments of the invention than the one described are possible. Thus the device is useful in other connections than in four wheel driven vehicles. Wedging action can be obtained in other ways than by using thread flanks, e.g. by using a non-circular axle arranged in a corresponding non-circular bore in a sleeve. The device can also be useful for single-acting freewheels. The raceways of the freewheel can be flat and arranged on disc-like elements, whereby one element is axially movable and wedging action is brought about by co-operation between e.g. two wave-formed or corrugated surfaces.

What is claimed is:

1. A freewheel mechanism for transmitting rotational movement between two elements (9, 10) and comprising a number of tiltable blocking members (11) arranged between two co-axial annular raceways arranged in connection to the respective elements, characterized in that one raceway is arranged on a body (12) co-operating with one element (9), the body being movable in relation to the element so that the distance between the raceway on the body and the raceway arranged in connection to the other element (10) is variable, the variations of the distance between the raceways being brought about by relative turning of the body (12) and the element (9) co-operating with the body.

2. A freewheel mechanism for transmitting rotational movement between two elements (9, 10) and comprising a number of tiltable blocking members (11) arranged between two co-axial annular raceways arranged in connection to the respective elements, characterized in that one raceway is arranged on a body (12) co-operating with one element (9), means defining co-operating wedging surfaces on the body (12) and the element (9) co-operating with the body, the body being movable in relation to the element so that the distance between the raceway on the body and the raceway arranged in connection to the other element (10) is variable, the variations of the distance between the raceways being brought about by relative turning of the body (12) and the element (9) co-operating with the body.

3. A mechanism according to claim 2, in which the freewheel is double-acting and the co-operating wedging surfaces have surface portions which are oppositely inclined.

4. A mechanism according to claim 3, in which the wedging surfaces are constituted by co-operating thread flanks, one of which being arranged in a bore in a body (12) made as a sleeve, and the other being formed on a journal (9) enclosed by the sleeve.

5. A freewheel mechanism for transmitting rotational movement between two elements (9, 10) and comprising a number of tiltable blocking members (11) arranged between two co-axial annular raceways arranged in connection to the respective elements, characterized in that one raceway is arranged on a body (12) co-operating with one element (9), the body being movable in relation to the element so that the distance between the raceway on the body and the raceway arranged in connection to the other element (10) is variable, the variations of the distance between the raceways being brought about by relative turning of the body (12) and the element (9) co-operating with the body, said turnable element co-operating with a brake which is initially blocking but upon surpassing a given torque is released when the direction of rotation of the element is reversed.

6. A mechanism according to claim 5, in which the brake is constituted by a freewheel device.

* * * * *